(12) United States Patent
Pietrala et al.

(10) Patent No.: US 11,261,031 B2
(45) Date of Patent: Mar. 1, 2022

(54) CONVEYOR PAN

(71) Applicant: Caterpillar Global Mining Europe GmbH, Lünen (DE)

(72) Inventors: Christoph Pietrala, Dortmund (DE); Uwe Tillessen, Kamen (DE); Eugen Baier, Schwelm (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 0 days.

(21) Appl. No.: 17/252,183

(22) PCT Filed: May 31, 2019

(86) PCT No.: PCT/EP2019/025167
§ 371 (c)(1),
(2) Date: Dec. 14, 2020

(87) PCT Pub. No.: WO2019/238265
PCT Pub. Date: Dec. 19, 2019

(65) Prior Publication Data
US 2021/0261345 A1  Aug. 26, 2021

(30) Foreign Application Priority Data

Jun. 14, 2018  (EP) .................................. 18177807

(51) Int. Cl.
*B65G 19/28*  (2006.01)
(52) U.S. Cl.
CPC ........ *B65G 19/28* (2013.01); *B65G 2201/045* (2013.01); *B65G 2207/48* (2013.01)

(58) Field of Classification Search
CPC ....................................................... B65G 19/28
(Continued)

(56) References Cited

U.S. PATENT DOCUMENTS 4,624,362 A    11/1986  Temme et al.
4,643,296 A *   2/1987  Braun .................. B65G 19/285
                                              198/735.4

(Continued)

FOREIGN PATENT DOCUMENTS

DE         3933884 A1    4/1991
DE        20000530 U1    4/2000
(Continued)

OTHER PUBLICATIONS

International Search Report related to Application No. PCT/EP2019/025167; reported on Sep. 12, 2019.
(Continued)

*Primary Examiner* — Douglas A Hess

(57) ABSTRACT

A conveyor pan for a chain scraper conveyor comprises a bottom plate and a pair of side profiles fixed to the bottom plate by welding. The conveyor pan has an increased wear resistance, in particular due to a specific geometry of a weld groove formed between the profile rails of the side profile and the bottom plate. The weld groove extends deeper into each profile rail, resulting in a more durable weld connection during use of the conveyor pan. In addition, a geometry of a pocket member for connecting adjacent conveyor pans and an inspection opening formed in the bottom plate have also been improved to result in an increased strength of the conveyor pan.

15 Claims, 5 Drawing Sheets

(58) Field of Classification Search
USPC .............................. 198/735.1, 735.2, 735.3
See application file for complete search history.

(56) References Cited

U.S. PATENT DOCUMENTS

| | | | |
|---|---|---|---|
| 4,656,952 A | 4/1987 | Dieter et al. | |
| 4,735,304 A * | 4/1988 | Schoop | B65G 19/285 198/735.3 |
| 5,938,000 A | 8/1999 | Fischer et al. | |
| 6,401,912 B1 * | 6/2002 | Bandy, Jr. | B65G 19/285 198/735.4 |
| 6,966,429 B2 * | 11/2005 | Vorsteher | B65G 19/28 198/735.2 |
| 7,325,670 B2 * | 2/2008 | Vorsteher | B65G 19/28 198/735.2 |
| 7,392,896 B2 | 7/2008 | Wirtz et al. | |
| 8,783,445 B2 * | 7/2014 | Ingendahl | B65G 19/287 198/735.2 |
| 8,794,429 B2 | 8/2014 | Fischer et al. | |
| 8,820,849 B2 | 9/2014 | Vasey et al. | |
| 10,563,508 B2 * | 2/2020 | Rimmington | E21C 35/20 |
| 2003/0213678 A1 | 11/2003 | Vorsteher et al. | |
| 2013/0313887 A1 | 11/2013 | Vasey et al. | |

FOREIGN PATENT DOCUMENTS

| | | |
|---|---|---|
| EP | 0785153 B2 | 5/2002 |
| FR | 2722766 B1 | 9/1996 |
| GB | 2991529 A | 2/2004 |

OTHER PUBLICATIONS

European Search Report related to Application No. 18177807.7; reported on Jan. 30, 2019.

* cited by examiner

CONVEYOR PAN

CROSS-REFERENCE TO RELATED APPLICATION

This Application is a 35 USC § 371 US National Stage filing of International Application No. PCT/EP2019/025167 filed on May 31, 2019 which claims priority under the Paris Convention to European Patent Application No, 18177807.7 filed on Jun. 14, 2018.

TECHNICAL FIELD

The present disclosure relates to mining applications. Particularly, the present disclosure relates to a wear-resistant conveyor pan for use in mining applications, in particular, for a chain scraper conveyor.

BACKGROUND

In longwall underground mining, a longwall mining installation extends along a longwall face to extract material therefrom, and subsequently advances in a working direction perpendicular to the longwall face. For example, a material winning plow (longwall plow) is guided along a plow guiding assembly attached to a chain scraper conveyor such that the plow reciprocates along the longwall face to extract material.

During operation, parts of the chain scraper conveyor, in particular, the conveyor pans of the same, are subject to considerable wear. Therefore, the conveyor pans have to be periodically repaired/replaced.

US 2013/0313887 A1 discloses a linepan section for a longwall mining machine. The linepan section includes a face-side rail, a gob-side rail, and a conveyor pan between the rails. Each rail is formed as a single-piece casting, and the conveyor pan is a substantially flat plate connected to a conveyor pan portion of each rail.

The present disclosure is directed, at least in part, to improving or overcoming one or more aspects of prior systems.

SUMMARY OF THE DISCLOSURE

In one aspect, the present disclosure relates to a conveyor pan for use in mining applications, in particular, for a chain scraper conveyor. The conveyor pan comprises a bottom plate and a pair of side profiles configured to be fixed to the bottom plate by welding. Each of the pair of side profiles comprises at least one profile rail extending along a longitudinal direction with a substantially T-shaped cross-section. Each profile rail includes a profile flange extending in a transverse direction and a profile web extending from the profile flange. The profile web includes a recess formed in a distal end of the same. The recess extends from a side surface of the profile web to a bottom surface of the profile web. At least part of the recess extends at an angle of less than 40° with respect to the transverse direction.

According to another aspect, the present disclosure relates to a conveyor pan for use in mining applications, in particular, for a chain scraper conveyor. The conveyor pan comprises a bottom plate and a pair of side profiles configured to be fixed to the bottom plate by welding. Each of the pair of side profiles comprises at least one profile rail extending along a longitudinal direction with a substantially T-shaped cross-section. Each profile rail includes a profile flange extending in a transverse direction and a profile web extending from the profile flange. The profile web includes a recess formed in a distal end of the same. The recess extends from a side surface of the profile web to a bottom surface of the profile web. A ratio of a width of the bottom surface to a depth of the recess when viewed in a direction perpendicular to the transverse direction is between 0.08 and 0.4, in particular, between 0.13 and 0.37.

According to another aspect, the present disclosure relates to a profile rail for a conveyor pan. The profile rail is configured to be fixed to a bottom plate of the conveyor pan by welding. The profile rail extends along a longitudinal direction with a substantially T-shaped cross-section and includes a profile flange extending in a transverse direction substantially perpendicular to the longitudinal direction and a profile web extending from the profile flange. The profile web includes a recess formed in a distal end of the same. The recess extends from a side surface of the profile web to a bottom surface of the profile web. At least part of the recess extends at an angle of less than 40° with respect to the transverse direction, and/or a ratio of a width of the bottom surface to a depth of the recess when viewed in a direction perpendicular to the transverse direction is between 0.08 and 0.4, in particular, between 0.13 and 0.37.

According to yet another aspect, the present disclosure relates to a pocket member for a conveyor pan. The pocket member is configured to be welded to a first profile rail and a second profile rail of a side profile of the conveyor pan. The pocket member is configured to receive a substantially dumbbell-shaped connection member for connecting adjacent conveyor pans. The pocket member includes a continuous base plate and a pair of engagement members protruding from the base plate in an upright manner. The pair of engagement members define an accommodation space for one end of the dumbbell-shaped connection member. The pocket member is symmetrically formed with respect to a central symmetry plane that is perpendicular to the base plate.

According to a further aspect, the present disclosure relates to a conveyor pan for use in mining applications, in particular, for a chain scraper conveyor. The conveyor pan comprises a bottom plate and a pair of side profiles configured to be fixed to the bottom plate by welding. The bottom plate includes an inspection opening configured to receive an inspection panel. The inspection opening is open at one side and closed at the other side in a transverse direction, and configured to slidably receive the inspection panel from the one side. A chamfered surface is formed in the part of the bottom plate closing the inspection opening on the other side. The chamfered surface extends outward from a top surface to a bottom surface of the bottom plate and is configured to engage with a mating chamfered front edge of the inspection panel.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings.

DETAILED DESCRIPTION

Figure 1:
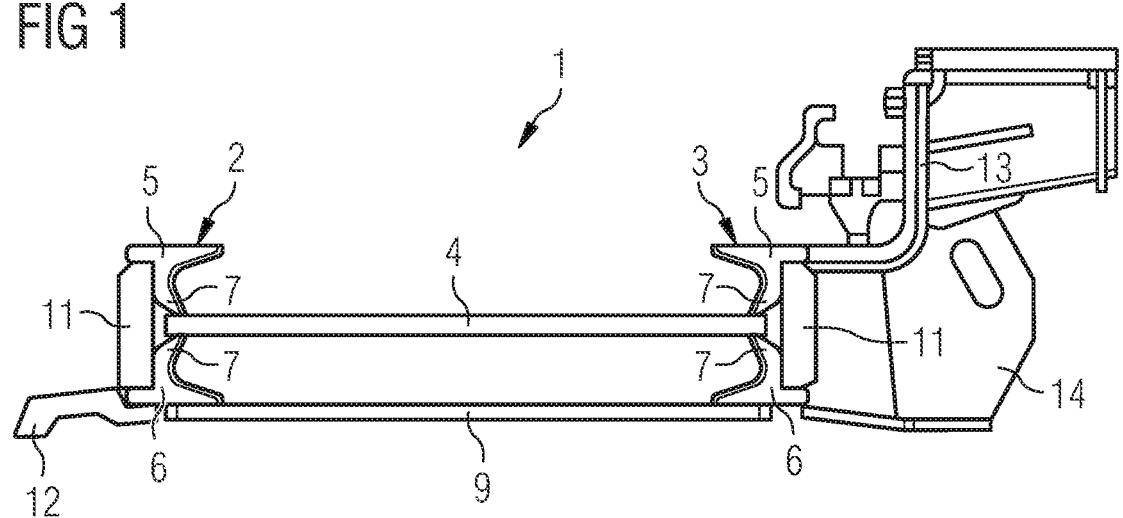
FIG. 1 shows a cross-sectional view of a conveyor pan of a chain scraper conveyor according to the present disclosure.

The following is a detailed description of exemplary embodiments of the present disclosure. The exemplary embodiments described herein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based in part on the realization that an important factor that affects the durability of a conveyor pan of a chain scraper conveyor is the weld connection between the bottom plate of the conveyor pan and the side profiles of the same. It has been realized that the commonly used weld preparation, i.e. providing a weld groove with a wedge-shaped cross-section, results in that the weld is usually destroyed long before the wear limit of the side profiles and the bottom plate has been reached. By providing a weld groove with an improved cross-section, a deeper weld groove can be obtained that ensures that at least part of the weld remains until the wear limit of the side profiles and the bottom plate has been reached. Using an appropriate cross-section of the weld groove, this can be achieved with substantially the same amount of weld material as in the conventional weld preparation.

In this respect, it has also been realized that it is advantageous that the geometry of the profile member including the weld groove (recess) is formed during manufacturing of the profile member, for example, by rolling or casting. In this manner, it is not necessary to machine the profile member in order to prepare the weld groove.

The present disclosure is further based in part on the realization that the wear limit of the conveyor pan as a whole can further be increased by providing a pocket member with a specific geometry. The pocket member is used for connecting adjacent conveyor pans and welded to side profiles of each conveyor pan. Here, it has been realized that it is advantageous to form the pocket member such that it is symmetrical with respect to a central symmetry plane. This allows using a pocket member having only a single configuration on both ends of the conveyor pan. Further, it has been realized that the strength of the pocket member can be increased by forming the same with a continuous base plate that is to be welded to the side profile.

It has also been realized that the durability of the pocket member can be further increased by providing a receptacle for a sacrificial anode in the pocket member. In this manner, corrosion of the pocket member, in particular, in the region where the dumbbell-shaped connecting members are received, can be suppressed. In this respect, it has been realized that there are several ways for attaching and replacing the sacrificial anode. For example, the sacrificial anode can be glued or screwed to the pocket member. As an alternative, a dowel pin or the like can be used to attach the sacrificial anode to the pocket member. As a further alternative, a clamping sleeve can be used to fix the sacrificial anode in the receptacle of the pocket member.

It has also been realized that the total height of the conveyor pan can be reduced by providing a tapered surface on the flange of each profile rail. In this manner, the profile rails that are welded to the bottom surface of the bottom plate and further welded to, for example, a guide member on the face side and a corresponding support member on the spoil side, can be connected to the respective members via the tapered surface, resulting in a height reduction compared to the case where the tapered surface is not provided on the flange of the profile rail. Of course, this requires that the tapered surface is formed over the entire length of the profile rail.

The present disclosure is also based on the realization that the wear resistance of a conveyor pan having an inspection panel that can be opened to access the conveyor bottom can be increased by providing the inspection panel such that it does not extend over the entire width of the conveyor pan. Instead, the inspection panel is provided in an inspection opening formed in a bottom plate of the conveyor pan, which is closed on one side in the transverse direction. In particular, in this manner, the face-side profile rails can be welded to the bottom plate of the conveyor pan over the entire length of the same, such that the weld is not interrupted.

In this respect, it has also been realized that the durability of the inspection panel, in particular, an engagement portion of the same for a lifting device configured to raise the inspection panel, can be further increased by providing the part of the bottom plate with which the inspection panel comes into contact in its closed state with a downwardly and outwardly inclined chamfered surface. Further, by providing the engagement portion in the bottom part of a corresponding chamfered edge of the bottom plate, it can be ensured that, even though the bottom plate and the inspection panel may be considerably worn, the engagement portion is not affected and can still be used to easily lift the inspection panel. In addition, the mating chamfered surfaces of the bottom plate and the inspection panel result in that an intrusion of material into the bottom part of the conveyor can be reliably prevented even after wear has occurred.

Referring now to the drawings, FIG. 1 shows a conveyor pan 1 for a chain scraper conveyor, in particular, a chain scraper conveyor to be used in underground longwall mining applications. As shown in FIG. 1, conveyor pan 1 comprises a bottom plate 4 and a pair of side profiles 2, 3 fixed to bottom plate 4 by welding on opposite sides of bottom plate 4 in a transverse direction. In the exemplary embodiment, each of side profiles 2, 3 of conveyor pan 1 is formed by two profile rails 5, 6 of equal configuration, which are welded to bottom plate 4 by way of slightly arcuate profile webs 7 directed towards bottom plate 4. The side profiles 2, 3 on the face side and on the spoil side, respectively, have the same configuration. Accordingly, a total of four identical profile rails 5, 6 are welded to bottom plate 4 of each conveyor pan 1. As will be described in more detail below, each profile rail 5, 6 extends along the longitudinal direction of conveyor pan 1 over the entire length of the same. In particular, as will also be described in more detail below, each profile rail 5, 6 extends along the longitudinal direction with a constant cross-section. Further, each profile rail 5, 6 extends with a substantially T-shaped cross-section and includes a profile flange 8 extending in a transverse direction (see, for example, FIG. 2), with profile web 7 extending from profile flange 8 towards bottom plate 4. Profile rails 5, 6 are configured as rolled or cast profiles and define guide passages for scraper flights (not shown) running in conveyor pan 1 in a known manner.

As shown in FIG. 1, connecting members for a drum rock cutter machine or the like, running above the chain scraper conveyor, are attached to conveyor pan 1. A guide member such as a rail 12 on the mining face side is attached to lower profile rail 6 of face-side profile 2 at the base of face-side profile 2. On the opposite side, a bracket-like fitting 13, which forms a guide profile including a chain passage for a pinwheel drive chain, and a connecting fitting 14 for connecting a self-advance mechanism are secured to conveyor pan 1 in a known manner. Pocket members 11 for connecting adjacent conveyor pans 1 are welded to side profiles 2, 3, in particular, at both ends of conveyor pan 1 in the longitudinal direction.

During operation of the chain scraper conveyor, a shearer (also not shown) cuts material from a mining face, and the cut material is loaded onto conveyor pan 1 via face-side profile 2 in a known manner.

Figure 2:
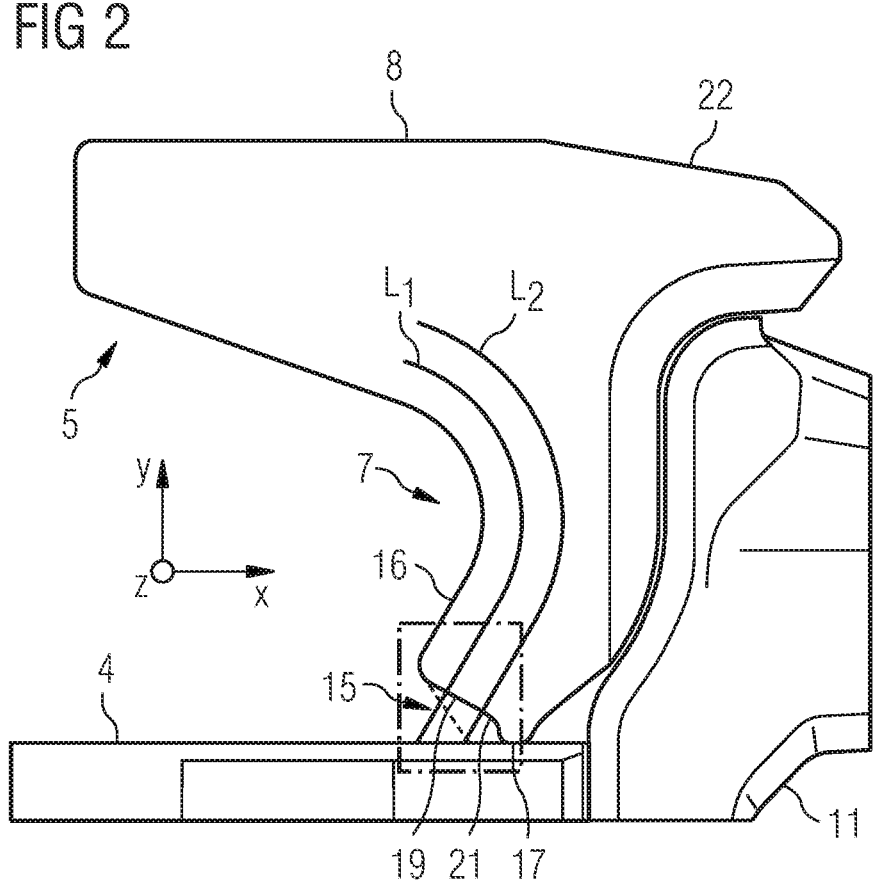
FIG. 2 shows a detailed cross-sectional view of a profile rail configured to be welded to a bottom plate of the conveyor pan according to the present disclosure.

FIG. 2 shows a configuration of a connecting portion between exemplary spoil-side upper profile rail 5 and bottom plate 4 of conveyor pan 1 in more detail. As shown in FIG. 2, profile web 7 is formed with an arcuate shape in a cross-section perpendicular to the longitudinal direction Z and rests on bottom plate 4 such that profile flange 8 is arranged essentially horizontally. In particular, a bottom surface 17 of profile web 7 is in contact with an upper surface of bottom plate 4, and a recess 15 is formed in a distal end of profile web 7. Recess 15 extends from a side surface 16 of profile web 7 to bottom surface 17. The configuration of recess 15 will be described in more detail below. However, as shown in FIG. 2, exemplary recess 15, in a cross-section perpendicular to the longitudinal direction, includes a substantially straight central portion 19 extending at an angle with respect to the transverse direction X, and an arcuate portion 21 extending from straight central portion 19 to bottom surface 17.

As will be readily appreciated by the skilled person, recess 15 forms a weld groove that is configured to receive weld material for welding profile rail 5 to bottom plate 4. For the sake of illustration, FIG. 2 also indicates a configuration of a conventional weld groove for welding a conventional profile rail to bottom plate 4 by a straight dashed line. As can be seen from FIG. 2, recess 15 according to the present disclosure extends farther into profile rail 5 when compared to a conventional weld groove. This results in that, as bottom plate 4 and profile rail 5 are worn during extended use of conveyor pan 1, such that the innermost material layers are removed, as indicated by the curved lines L1 and L2 in FIG. 2, after wear has occurred up to the second line L2, a conventional weld would be destroyed completely, whereas, with the configuration of recess 15 disclosed herein, an amount of weld material remains inside recess 15, such that profile rail 5 remains securely connected to bottom plate 4.

As also shown in FIG. 2, profile flange 8, which extends in transverse direction X, includes a tapered surface 22 extending at an angle with respect to the transverse direction to a side opposite to the side on which recess 15 is formed, i.e., to the outer side of conveyor pan 1. This will also be described in more detail below.

Figure 3:
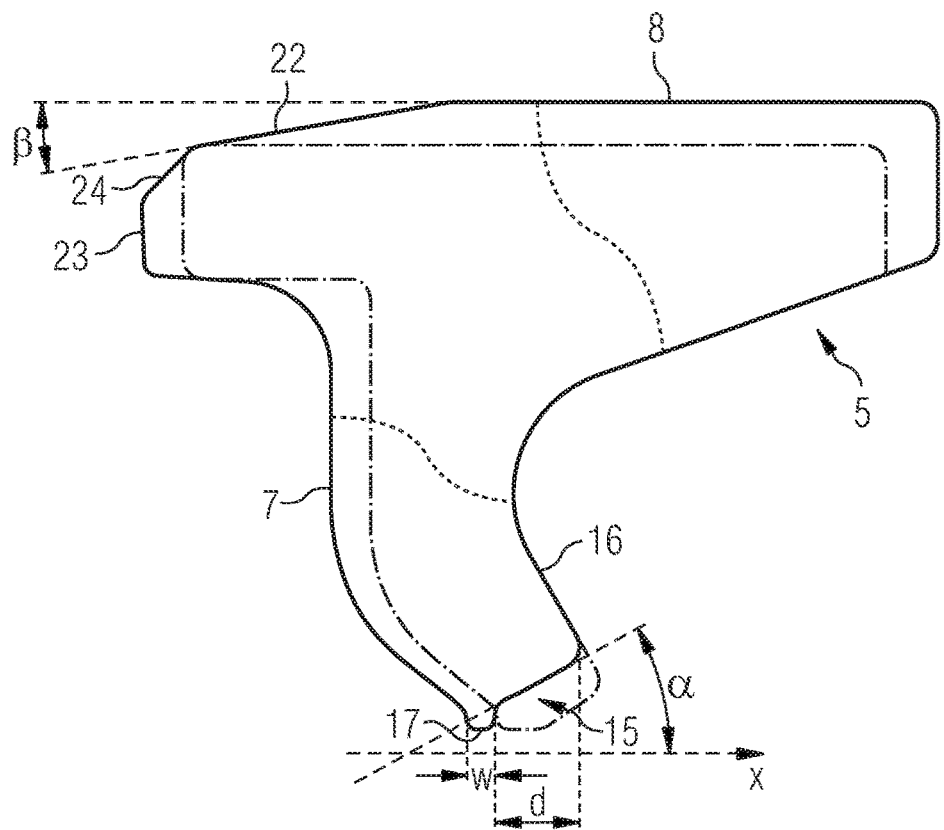
FIG. 3 is an exemplary cross-section showing a geometry of a profile rail according to the present disclosure.

FIG. 3 shows an exemplary geometry of a profile rail 5 of the present disclosure, in comparison to a corresponding geometry of a conventional profile rail, which is indicated by a dot-dashed line. As indicated in FIG. 3 by a dashed line, a width of profile web 7 is increased with respect to the conventional profile rail. Likewise, a height of profile flange 8 is also increased. In the same manner, a width in transverse direction X is also increased with respect to the conventional profile. This allows for an increased overlap between profile flange 8 and bottom plate 4. In addition, the wear resistance of profile rail 5 as a whole is increased by the increased thickness of the same.

The bottom part of FIG. 3 shows in more detail how recess 15 extends from side surface 16 to bottom surface 17. Namely, it can be seen from FIG. 3 that at least part of recess 15 extends at an angle $\alpha$ of less than 40° with respect to transverse direction X. In particular, substantially straight central portion 19 (FIG. 2) extends at the angle $\alpha$ with respect to transverse direction X. As previously described, this allows recess 15 to extend deeper into profile rail 5 such that significantly more material can be removed from the inner side of profile rail 5 before all of the weld material inside recess 15 has also been removed. In this manner, recess 15 may be configured as substantially a J-groove for forming a single J-weld between profile rail 5 and bottom plate 4. In some embodiments, angle $\alpha$ is between 15° and 39°, in particular, between 18° and 25°, for example, around 20°.

As also shown in FIG. 3, in some embodiments, a ratio of a width w of bottom surface 17 to a depth d of recess 15 when viewed in a direction perpendicular to the transverse direction X, i.e., a distance between an innermost edge of profile web 7 to the point of contact between bottom surface 17 and bottom plate 4, is between 0.08 and 0.4, in particular, between 0.13 and 0.37. For example, w may be between 2 and 8 mm, and d may be around 22 mm.

As also shown in FIG. 3, tapered surface 22 of profile flange 8 extends at an angle $\beta$ of between 5° and 25°, in particular, between 6° and 10° with respect to transverse direction X from a substantially flat top surface of profile flange 8 to a side surface on the side opposite to the side on which recess 15 is formed. In the exemplary embodiment, tapered surface 22 does not extend all the way to a substantially vertical outer surface 23 of profile flange 8, but a further tapered intermediate surface 24 is provided between tapered surface 22 and outer surface 23. However, in other embodiments, surface 24 can be omitted.

Figure 4:
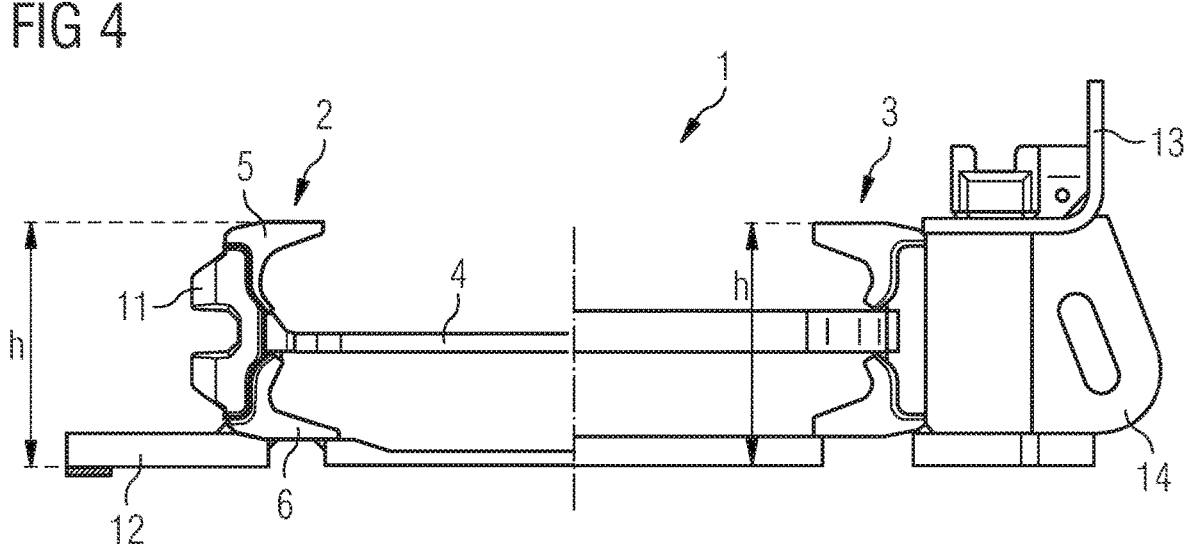
FIG. 4 is a schematic cross-sectional view showing a comparison between a new conveyor pan and a worn conveyor pan according to the present disclosure.

As shown in FIG. 4, lower profile rail 6 of face-side profile 2 is connected to guide member 12 at a corresponding tapered surface of the same by welding. In this manner, as will be readily appreciated by the skilled person, a total height h on the side of face-side profile 2 can be reduced compared to a case where tapered surface 22 is not provided, i.e., the bottom surface of profile flange 8 is formed in a straight manner. The same advantage can be obtained on the opposite side for spoil-side profile 3, also due to the provision of tapered surface 22 on the lower profile rail. Additionally, tapered surface 22 on upper profile rail 5 allows for better loading of the material into conveyor pan 1. As previously mentioned, in the exemplary embodiment, tapered surface 22 extends over the entire length of profile rails 5, 6 in the longitudinal direction.

FIG. 4 also shows a comparison of a newly installed conveyor pan 1 (right side) to a worn conveyor pan (left side). Here, although bottom plate 4 and face-side profile rails 5, 6 are worn considerably, at least a portion of the weld between upper profile rail 5 and an outer portion of bottom plate 4 remains, such that profile rail 5 remains securely connected to bottom plate 4. FIG. 4 also illustrates pocket member 11, which is welded to bottom plate 4, lower profile rail 6, and upper profile rail 5. A configuration of pocket member 11 will be described in the following.

As previously mentioned, conveyor pan 1 comprises a pair of pocket members 11 configured to be welded to upper profile rail 5 and lower profile rail 6 of each side profile 2, 3 on opposite ends of conveyor pan 1 in the longitudinal direction Z. Each pocket member 11, as shown in FIG. 5, is configured to receive a substantially dumbbell-shaped connection member 30 (see, for example, FIG. 7) for connecting adjacent conveyor pans 1.

Figure 5:
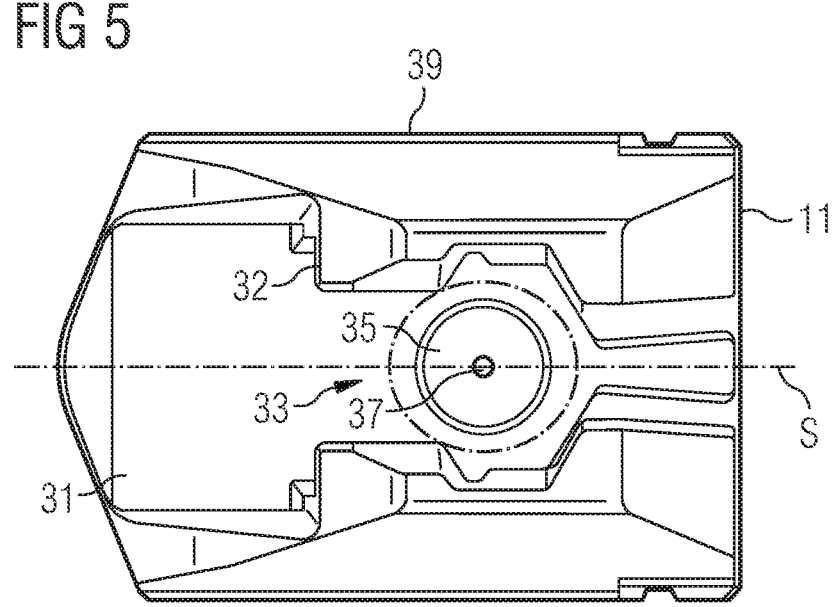
FIG. 5 shows a perspective plan view of a pocket member according to the present disclosure.

As shown in FIG. 5, each pocket member 11 includes a continuous (solid) base plate 31 and a pair of engagement members 32 protruding from base plate 31 in an upright manner. The pair of engagement members 32 defines an accommodation space 33 for one end 34 of dumbbell-shaped connection member 30 (see FIG. 7). Connection member 30 is secured on both sides in respective pocket members 11 in a known manner to connect adjacent conveyor pans 1.

Figure 6:
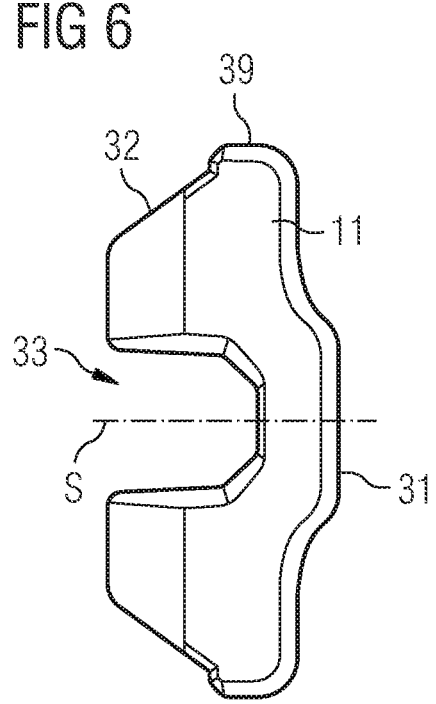
FIG. 6 shows a perspective side view of the pocket member according to the present disclosure.

As shown in FIG. 5, pocket member 11 is symmetrically formed with respect to a central symmetry plane S that is perpendicular to base plate 31. This can also be seen by the side view that is shown in FIG. 6. It will be readily appreciated that this configuration results in that pocket member 11 can be used to connect adjacent conveyor pans 1 on both sides, as in the exemplary conveyor pan shown in FIG. 7. Here, continuous base plate 21 further increases the stability of side profiles 2, 3 when it is welded to the same. Further, due to the symmetric configuration of pocket member 11, both the upper and the lower portion of the same have essentially the same strength, as shown in FIG. 6. This further increases the durability of conveyor pan 1.

As also shown in FIG. 5, pocket member 11 comprises a receptacle 35 for a sacrificial anode formed in base plate 31 at a position between engagement members 32. Inside receptacle 35, a sacrificial anode can be attached to pocket member 11, for example, using a clamping sleeve (not shown) to be inserted in a through hole of, for example, a circular disc-shaped sacrificial anode and a matching smaller recess provided at the bottom of receptacle 35. It will be readily appreciated that any suitable manner of attaching a sacrificial anode to pocket member 11 inside receptacle 35 can be used, for example, gluing, screwing, etc. The sacrificial anode prevents corrosion of pocket member 11, in particular, at the position of the end 34 of dumbbell-shaped connection member 30.

As also shown in FIG. 5, in some embodiments, pocket member 11 includes a machinable edge portion 39 on both sides of base plate 31 in the height direction. This allows for fitting pocket member 11 to profile rails 5 and 6 welded to bottom plates having a reduced thickness. As can be seen from, for example, FIG. 4, for a given thickness of bottom plate 4, and profile rails 5, 6 having a given height, pocket member 11 also has to have a matching height to fit into the space formed between profile rails 5, 6 and to be securely welded to the same. However, in case a bottom plate having a reduced thickness is to be used, the available space for pocket member 11 will also be reduced accordingly. This can be compensated by removing an appropriate amount of machinable edge portion 39 that results in that pocket member 11 again fits into the space formed between profile rails 5, 6. Therefore, the same cast pocket member 11 can be used for conveyor pans with bottom plates of different strength (height).

Figure 7:
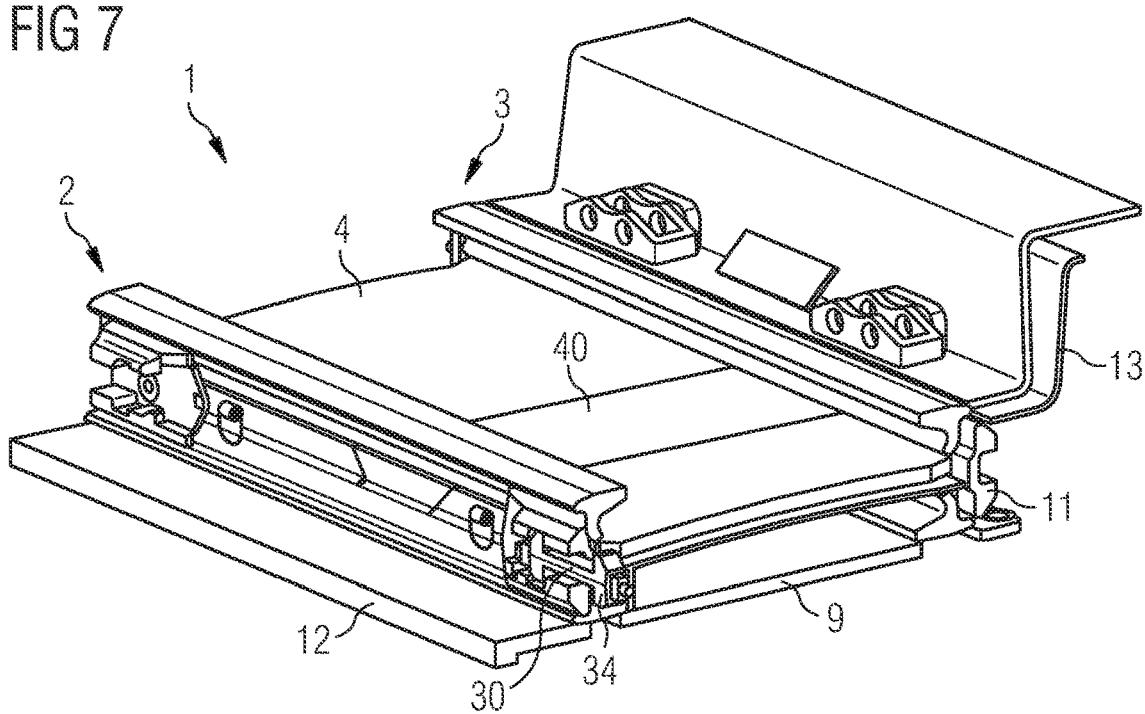
FIG. 7 shows a schematic perspective view of a conveyor pan including an inspection panel according to the present disclosure.

As is known to the skilled person, in a conveyor such as a chain scraper conveyor, some conveyor pans are provided with inspection doors or panels that allow access to the bottom part of the conveyor. FIG. 7 shows an exemplary embodiment of a conveyor pan 1 including an inspection panel 40 provided in a corresponding inspection opening 42 (see FIG. 8) of bottom plate 4. It will be appreciated that conveyor pan 1 shown in FIG. 7 is configured essentially in the same manner as conveyor pan 1 described above, except for the provision of inspection panel 40 inside inspection opening 42. Therefore, only the differences will be described.

Figure 8:
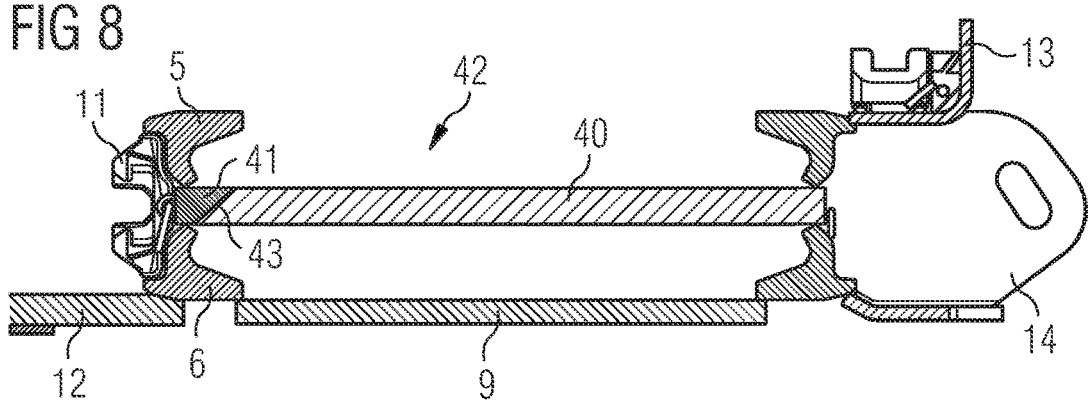
FIG. 8 shows a cross-sectional view of the conveyor pan including the inspection panel according to the present disclosure.

As shown in FIG. 7, inspection panel 40 is formed as a substantially rectangular plate-shaped member that is disposed in inspection opening 42 formed in bottom plate 4. Further, as shown in FIG. 8, inspection opening 42 is open at one side and closed on the other side in the transverse direction. In particular, inspection opening 42 is configured to slidably receive inspection panel 40 from one side, namely, the side opposite to the face side. Although this is not shown in the drawings, it will be appreciated that inspection panel 40 is supported in inspection opening 42 by bottom plate 4 in a known manner, for example, by providing a corresponding stepped recess or corresponding conical surface, such that inspection panel 40 cannot fall through inspection opening 42 and can be slid in the transverse direction inside inspection opening 42.

As shown in FIG. 8, a chamfered surface 43 is formed in a part 41 of bottom plate 4 closing inspection opening 42 on the other side. In particular, chamfered surface 43 extends downward and outward from the top surface to a bottom surface of bottom plate 4. In other words, inspection opening 42 becomes narrower towards the upper side of bottom plate 4. Chamfered surface 43 is configured to engage with a mating chamfered front edge 45 of inspection panel 40 when inspection opening 42 is closed by inspection panel 40. This is shown in FIG. 8. As also shown in FIG. 8, chamfered front edge 45 of inspection panel 40 includes an engagement portion 46 for a lifting device (not shown) configured to raise inspection panel 40 when the same is partially retracted from inspection opening 42. In the embodiment, engagement portion 46 is configured as a threaded bore extending substantially perpendicular to chamfered front edge 45 in a lower part of the same. Therefore, it will be readily appreciated that, after inspection panel 40 has been retracted slightly from inspection opening 42, engagement portion 46 is accessible from the upper side of conveyor pan 1. Accordingly, the lifting device can be engaged with engagement portion 46, and one side of inspection panel 40 can be lifted upwards. Here, it will be appreciated that face-side profile rails 5, 6 are welded to bottom plate 4 along the entire length of the same, whereas a slot is provided between the corresponding profile rails 5, 6 on the opposite side at the position where inspection opening 42 is formed. The slot is configured such that, after inspection panel 40 has been partially retracted from inspection opening 42, the same can pivot inside the slot to allow lifting of the opposite side of inspection panel 40 by the lifting device. After inspection panel 40 has been lifted, it can then be removed from conveyor pan 1, for example, by moving the same towards the face side over upper face-side profile rail 5. Of course, re-insertion of inspection panel 40 can be performed in the same manner.

Figure 9:
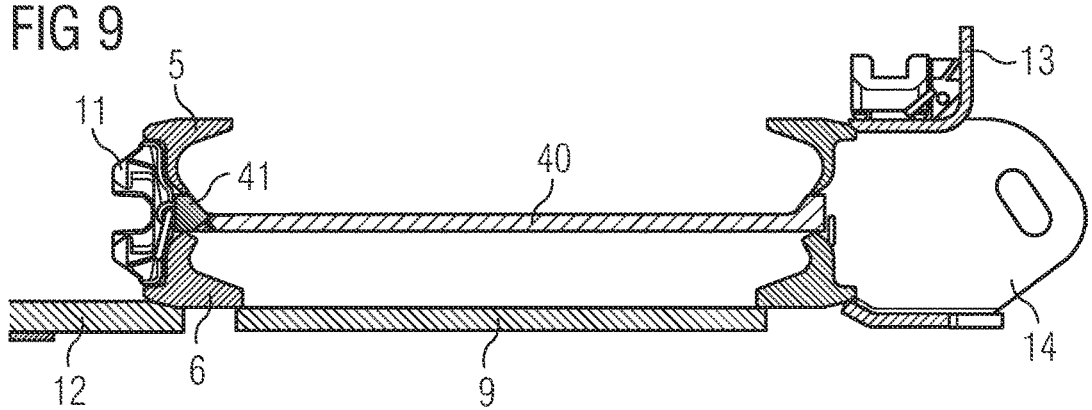
FIG. 9 shows a schematic cross-sectional view of the worn conveyor pan including the inspection panel according to the present disclosure.
Figure 10:
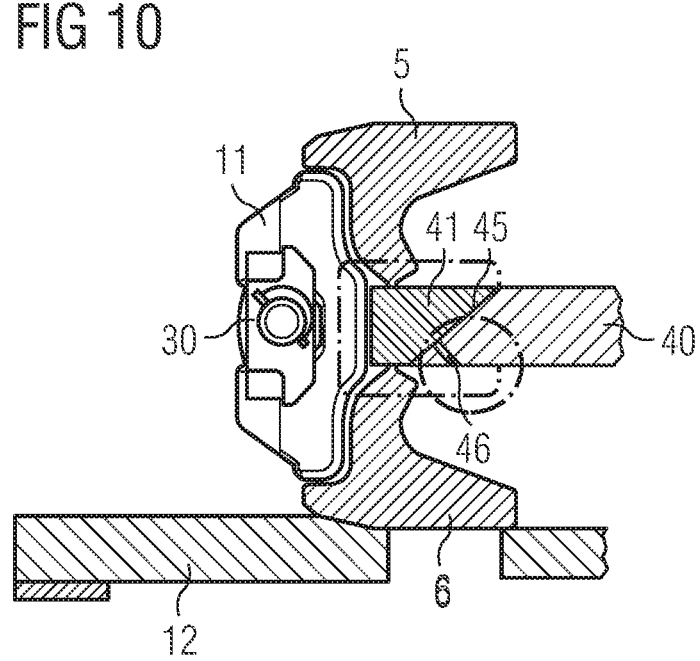
FIG. 10 shows detailed cross-sectional views of a part of the conveyor pan including the inspection panel for illustrating an interface between a bottom plate of the conveyor pan and the inspection panel.
Figure 10:
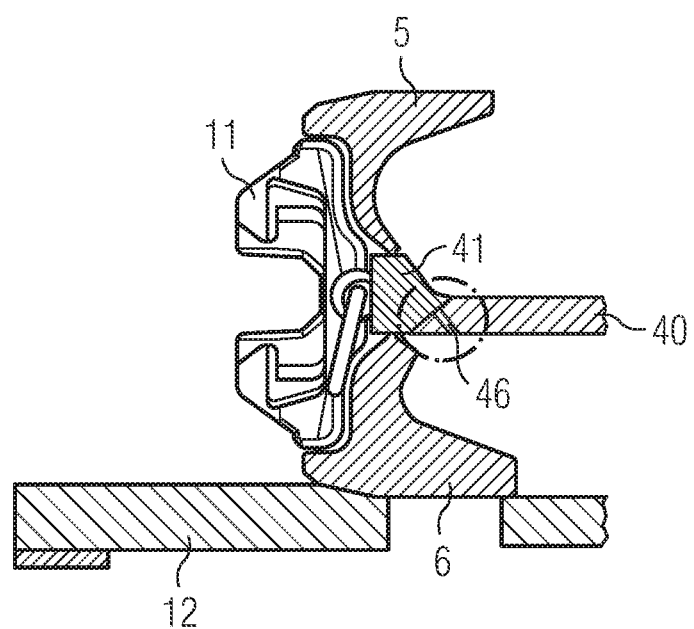

FIG. 9 shows the configuration of inspection panel 40 and bottom plate 4 after extended use of conveyor pan 1. Here, it can be seen that, although both inspection panel 40 and bottom plate 4, in particular, the part 41 of the same engaging with inspection panel 40, are worn considerably, there is still a tight connection between the same to prevent material from entering the bottom part of conveyor pan 1. In particular, as shown in FIG. 10, due to engagement portion 46 being formed in the lower part of chamfered front edge 45, the same is protected by the chamfered part 41 of bottom plate 4, such that it is not affected by wear. Therefore, even in the worn stage shown on the right side of FIG. 10, inspection panel 40 can be reliably removed by engagement with the lifting device. It will be appreciated that engagement portion 46 is not limited to the exemplary configuration described above, and can have any suitable configuration that allows for engagement with the lifting device.

INDUSTRIAL APPLICABILITY

The above-described embodiments of the conveyor pan and its various parts disclosed herein can be used to provide a conveyor pan with an increased wear resistance, for example, for use in underground mining. In particular, the combination of the above-described improvements may result in that a conveyor pan for a chain scraper conveyor has a significantly increased durability. For example, a wear limit of the upper part of the conveyor pan disclosed herein may be up to 40 mm, in comparison to 20 mm for a known conveyor pan.

In addition, with the tapered surface 22 provided for the profile flange 8 of each profile rail 5, 6, a total height of conveyor pan 1 can be decreased for a bottom plate 4 having the same thickness, or remain the same for a bottom plate 4 having an increased thickness. This is facilitated by tapered surface 22 extending over the entire length of profile rails 5, 6.

Likewise, the provision of inspection opening 42 that is closed on one side allows for a continuous weld over the entire length in the longitudinal direction between the profile rails and the bottom plate on that side, resulting in an increased strength of the conveyor pan.

Although the preferred embodiments have been described herein, improvements and modifications may be incorporated without departing from the scope of the following claims.

For example, while the conveyor pan 1 described above has been described as a so-called mono conveyor pan, i.e., a one-piece conveyor pan, the present disclosure is not limited to such a mono conveyor pan. For example, the profile rails and/or connection members described herein could also be used in a so-called hybrid pan, where only the upper or lower profile rails are welded to a corresponding bottom plate to form an exchangeable trough. Likewise, the configuration of inspection panel 40 described herein can also be used in other types of conveyor pans, independent from the configuration of the side profiles of the same. In the same manner, the pocket member 11 described herein can also be used in other types of conveyor pans, independent from the configuration of profile rails 5, 6 and bottom plate 4.

The invention claimed is:

1. A conveyor pan comprising:
a bottom plate; and
a pair of side profiles configured to be fixed to the bottom plate by welding, each of the pair of side profiles comprising at least one profile rail extending along a longitudinal direction with a substantially T-shaped cross-section and including a profile flange extending in a transverse direction and a profile web extending from the profile flange,
wherein the profile web includes a recess formed in a distal end of the same, the recess extending from a side surface of the profile web to a bottom surface of the profile web, at least part of the recess extending at an angle ($\alpha$) of less than 40° with respect to the transverse direction
wherein a ratio of a width of the bottom surface to a depth of the recess when viewed in a direction perpendicular to the transverse direction is between 0.08 and 0.4.

2. The conveyor pan of claim 1, wherein the angle (a) is between 15° and 39°, or between 18° and 25°, or around 20°.

3. The conveyor pan of claim 1, wherein the ratio of a width of the bottom surface to a depth of the recess when viewed in the direction perpendicular to the transverse direction between 0.13 and 0.37.

4. The conveyor pan of claim 1, wherein the recess, in a cross-section perpendicular to the longitudinal direction, includes a substantially straight central portion extending at the angle ($\alpha$) with respect to the transverse direction, and an arcuate portion extending from the straight central portion to the bottom surface.

5. The conveyor pan of claim 1, wherein the recess is configured as substantially a J-groove for forming a single-J weld between the profile rail and the bottom plate.

6. The conveyor pan of claim 1, wherein the profile flange includes a tapered surface extending at an angle ($\beta$) of between 5° and 25°, or between 6° and 10°, with respect to the transverse direction to a side opposite to the side on which the recess is formed.

7. The conveyor pan of claim 1, wherein the profile rail extends along the longitudinal direction with a constant cross-section.

8. The conveyor pan of claim 1, wherein each of the pair of side profiles comprises a first profile rail and a second profile rail having the same configuration and being configured to be welded to the bottom plate on opposite sides of the same.

9. A conveyor pan for a chain scraper conveyor, the conveyor pan comprising:
a bottom plate;
a pair of side profiles configured to be fixed to the bottom plate by welding, each of the pair of side profiles comprising a first profile rail and a second profile rail having the same configuration and being configured to be welded to the bottom plate on opposite sides of the same, each of the first profile rail and the second profile rail extending along a longitudinal direction with a substantially T-shaped cross-section and including a profile flange extending in a transverse direction and a profile web extending from the profile flag wherein the profile web includes a recess formed in a distal end of the same, the recess extending from a side surface of the profile web to a bottom surface of the profile web, at least part of the recess extending at an angle ($\alpha$) of less than 40° with respect to the transverse direction; and a pair of pocket members configured to be welded to the first profile rail and the second profile rail of each side profile on opposite ends of the conveyor pan in the longitudinal direction, and to receive a substantially dumbbell-shaped connection member for connecting adjacent conveyor pans, wherein each pocket member includes a continuous base plate and a pair of engagement members protruding from the base plate in an upright manner, the pair of engagement members defining an accommodation space for one end of the dumbbell-shaped connection member, and wherein each pocket member is symmetrically formed with respect to a central symmetry plane that is perpendicular to the base plate.

10. The conveyor pan of claim 9, wherein each pocket member comprises a receptacle for a sacrificial anode formed in the base plate at a position between the pair of engagement members.

11. The conveyor pan of claim 9, wherein each pocket member includes a machinable edge portion on both sides of the base plate to allow for fitting the pocket member to the first profile rail and the second profile rail welded to bottom plates having a reduced thickness.

12. A conveyor pan for a chain scraper conveyor, the conveyor pan comprising:

a bottom plate; and a pair of side profiles configured to be fixed to the bottom plate by welding, each of the pair of side profiles comprising at least one profile rail extending along a longitudinal direction with a substantially T-shaped cross-section and including a profile flange extending in a transverse direction and a profile web extending from the profile flange, wherein the profile web includes a recess formed in a distal end of the same, the recess extending from a side surface of the profile web to a bottom surface of the profile web, at least part of the recess extending at an angle ($\alpha$) of less than 40° with respect to the transverse direction, wherein the bottom plate includes an inspection opening configured to receive an inspection panel, wherein the inspection opening is open at one side and closed on the other side in the transverse direction, and configured to slidably receive the inspection panel from the one side, and wherein a chamfered surface is formed in the part of the bottom plate closing the inspection opening on the other side, the chamfered surface extending outward from a top surface to a bottom surface of the bottom plate and being configured to engage with a mating chamfered front edge of the inspection panel.

13. The conveyor pan of claim 12, further comprising the inspection panel, wherein the chamfered front edge of the inspection panel includes an engagement portion for a lifting device configured to raise the inspection panel partially retracted from the inspection opening.

14. The conveyor pan of claim 13, wherein the engagement portion is configured as a threaded bore extending substantially perpendicular to the chamfered front edge in a lower part of the same.

15. The conveyor pan of claim 12, wherein the at least one profile rail on the other side is welded to the bottom plate over the entire length of the same in the longitudinal direction.

* * * * *